(12) United States Patent
Larsson et al.

(10) Patent No.: US 10,680,491 B2
(45) Date of Patent: Jun. 9, 2020

(54) MOTOR WITH INTEGRATED JUNCTION BOX

(71) Applicant: Wayne Fueling Systems LLC, Austin, TX (US)

(72) Inventors: Bengt I. Larsson, Skivarp (SE); Mattias G. Martensson, Kavlinge (SE)

(73) Assignee: Wayne Fueling Systems LLC, Austin, TX (US)

( * ) Notice: Subject to any disclaimer, the term of this patent is extended or adjusted under 35 U.S.C. 154(b) by 199 days.

(21) Appl. No.: 15/830,922

(22) Filed: Dec. 4, 2017

(65) Prior Publication Data

US 2018/0145556 A1    May 24, 2018

Related U.S. Application Data

(63) Continuation of application No. 14/573,482, filed on Dec. 17, 2014, now Pat. No. 9,837,873.

(51) Int. Cl.
| | |
|---|---|
| *H02K 5/22* | (2006.01) |
| *H02K 5/136* | (2006.01) |
| *H02K 15/00* | (2006.01) |
| *H02K 15/14* | (2006.01) |
| *H02K 5/15* | (2006.01) |

(52) U.S. Cl.
CPC ............ *H02K 5/225* (2013.01); *H02K 5/136* (2013.01); *H02K 5/15* (2013.01); *H02K 15/0006* (2013.01); *H02K 15/14* (2013.01)

(58) Field of Classification Search
CPC .... H02K 15/0006; H02K 15/14; H02K 5/136; H02K 5/15; H02K 5/225
USPC .......................................................... 310/71
See application file for complete search history.

(56) References Cited

U.S. PATENT DOCUMENTS

| 4,266,336 | A | 5/1981 | Kasey |
| 9,837,873 | B2 * | 12/2017 | Larsson ................... H02K 5/15 |
| 2006/0273669 | A1 | 12/2006 | Pfannschmidt |
| 2007/0159017 | A1 | 7/2007 | Martin et al. |
| 2012/0045353 | A1 | 2/2012 | Watanabe et al. |

(Continued)

FOREIGN PATENT DOCUMENTS

CN    202759320 U    2/2013

OTHER PUBLICATIONS

International Search Report with Written Opinion corresponding to International Patent Application No. PCT/US2015/065461, dated Mar. 3, 2016, 12 pages.

(Continued)

*Primary Examiner* — Alex W Mok
(74) *Attorney, Agent, or Firm* — Mintz Levin Cohn Ferris Glovsky and Popeo, P.C.

(57) ABSTRACT

Methods and devices are provided that allow for easy replacement of a motor assembly in a fuel dispensing unit. In one embodiment, a protective end cap for use with a motor assembly is provided and includes a junction box housing having a sealed end that can couple to a motor, and an opposite open end that can couple to an end plate. The junction box housing can be configured to house a junction box that allows electrical wires extending through the end plate to couple to electrical wires extending from the motor through the sealed end of the junction box housing. A motor assembly having a junction box housing and methods for replacing a motor assembly in a fuel dispenser are also provided.

16 Claims, 7 Drawing Sheets

(56) References Cited

U.S. PATENT DOCUMENTS

2013/0067735 A1     3/2013   Jennings et al.
2013/0140929 A1     6/2013   Lee et al.

OTHER PUBLICATIONS

International Preliminary Report on Patentability received for PCT International Application No. PCT/US2015/065461, dated Jun. 29, 2017, 11 pages.

* cited by examiner

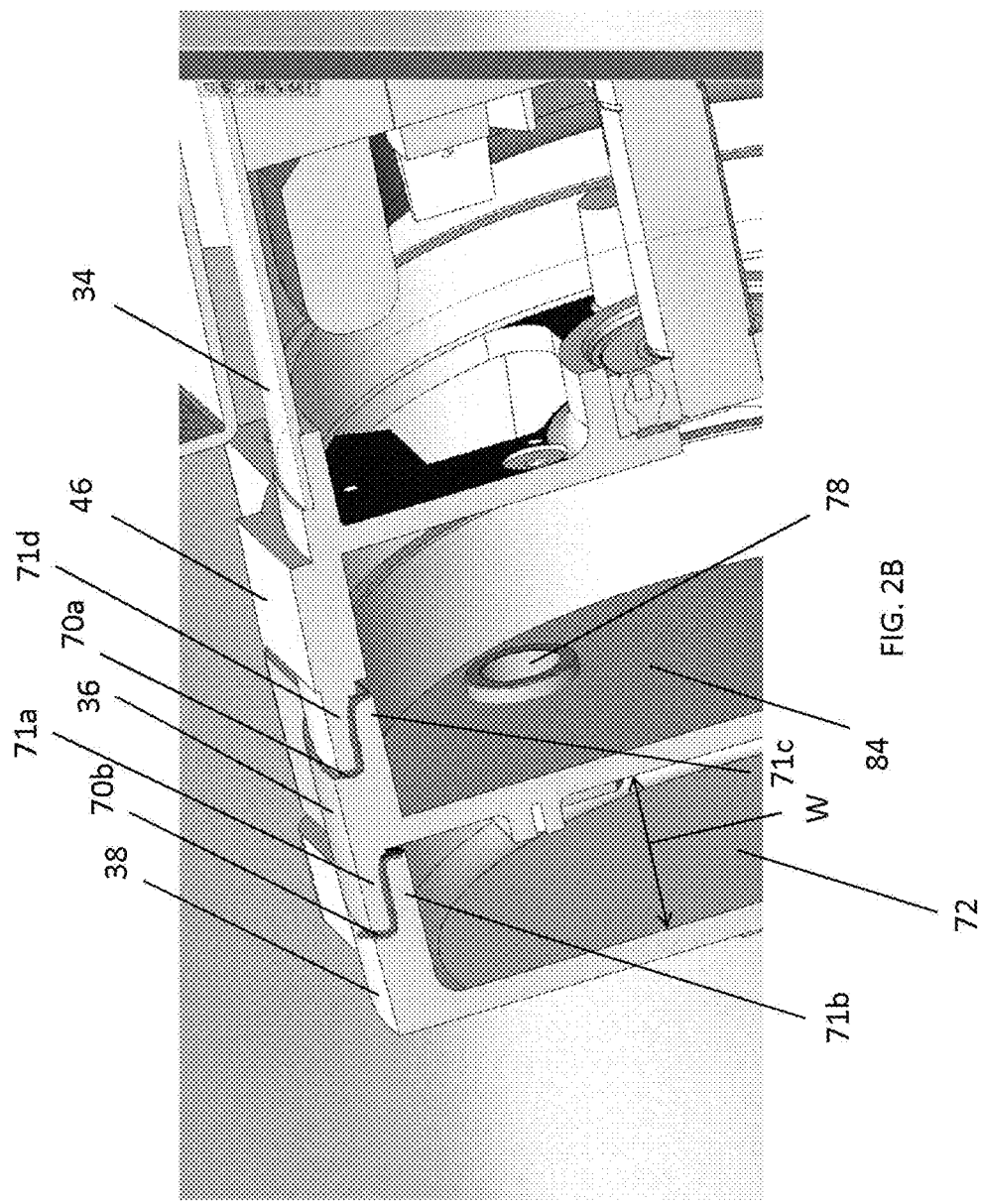

MOTOR WITH INTEGRATED JUNCTION BOX

CROSS REFERENCE TO RELATED APPLICATIONS

The present application claims priority to U.S. patent application Ser. No. 14/573,482 entitled "Motor with Integrated Junction Box" filed Dec. 17, 2014, which is hereby incorporated by reference in its entirety.

FIELD

The present invention relates to a motor assembly for use in a fuel dispenser compartment, and in particular to a motor with an integrated junction box, as well as methods for conveniently replacing motors in the field.

BACKGROUND

A fuel dispenser generally includes an electrical motor running on a predefined voltage. The electrical motor may need to be installed in the field for various reasons. It is well-known that fuel, such as gasoline, is a highly inflammable substance that produces easily ignitable vapor and must be handled with extreme care. As such, safety standards such as the UL standards in North America, the ATEX directive in the EU, or the European standard EN 13617 pertaining to petrol filling stations have been created for fuel handling in order to reduce potential risks. According to these standards, electromechanical devices, such as electrical motors, must be enclosed in explosion-proof housings, isolated through the use of intrinsically safe circuitry, and/or sealed with epoxy like materials in order to prevent the sparks from igniting fuel vapors. Accordingly, replacing an electric motor in the field requires the removal of such safety measures which may not always be possible and/or easy to perform. Therefore, there exists a need for devices and methods that allow an electric motor in a fuel dispenser to be replaced in the field in a more convenient fashion.

SUMMARY

In general, methods and devices are provided that allow for easy replacement of a motor in a fuel dispenser. In one embodiment, a motor assembly is provided and includes a motor housing having a motor disposed therein and an open end, an end plate having an opening formed therethrough for receiving at least one electrical connector therethrough, and a junction box housing coupled between the open end of the motor housing and the end plate, the junction box housing having a barrier wall extending thereacross such that a junction box compartment is formed between the barrier wall and the end plate. The barrier wall can include an opening formed therethrough for receiving an electrical connector from the motor. The junction box housing can also include a junction box disposed within the compartment and configured to couple at least one electrical connector extending through the opening in the end plate with at least one electrical connector extending from the motor and through the opening in the barrier wall.

The motor assembly can have a variety of configurations. In one embodiment, the end plate can be removably mated to the junction box housing. In other aspects, the motor can include a plurality of electrical connectors that extend through the opening in the barrier wall to connect to the junction box. In another embodiment, the opening in the end plate can include a connector that comprises a swivel. In other aspects, the junction box housing can maintain the end plate at a distance apart from the open end of the motor housing. By way of non-limiting example, the distance between the barrier wall and the end plate can be about 30 mm.

A protective end cap assembly for use with a motor in a fuel dispenser system is also provided and in one embodiment includes a junction box housing having a barrier wall extending thereacross between first and second ends. The first end can be configured to mate to an open end of a motor housing such that the barrier wall seals a motor within the motor housing, and the barrier wall can have at least one opening formed therethrough for receiving at least one electrical connector on a motor. The assembly can further include an end plate that is releasably matable to the second end of the junction box housing such that the end plate and the barrier wall define a junction box compartment therebetween. The end plate can have a connector coupled thereto and defining a pathway therethrough for receiving at least one electrical connector such that the at least one electrical connector can extend through the end plate and into the junction box compartment in for mating to a junction box.

In one aspect, the assembly can further include a junction box disposed within the junction box compartment and configured to connect at least one electrical connector from a motor to at least one electrical connector extending through the connector. In other aspects, the connector on the end plate can comprise a swivel. In another embodiment, the junction box housing can maintain the end plate at a distance apart from the barrier wall of the junction box housing. The distance can be, for example, about 30 mm. The assembly can also include a conduit extending through the connector, the conduit having a pathway formed therethrough for receiving at least one electrical connector.

In other aspects, a method for replacing a motor in a fuel dispenser is provided. The method can include detaching an end plate from a junction box housing coupled to a motor to expose a junction box contained within the junction box housing. The junction box can be isolated from the motor by a barrier wall disposed between the motor and the junction box. The method can further include decoupling at least one electrical connector from the junction box to allow the motor and junction box housing to be removed, the at least one electrical connector extending from the motor and through the barrier wall.

In other aspects, the method can include attaching at least one electrical connector extending from a second motor, through a barrier wall of a second junction box housing, to the junction box, and attaching the second junction box housing to the end plate to retain the junction box within the second junction box housing. In an exemplary embodiment, the end plate, junction box housing, and the motor are disposed within a fuel dispenser housing. The method can thus include, prior to detaching the end plate, opening an access door of the fuel dispenser housing to access the motor. In other aspects, the motor can be mounted onto a bracket, and the method can include detaching the motor from the bracket. In another embodiment, the end plate can include a plurality of electrical connectors extending therethrough and coupled to the junction box, the plurality of electrical connectors providing power to the motor when the motor is electrically coupled to the junction box.

BRIEF DESCRIPTION OF THE DRAWINGS

The invention will be more fully understood from the following detailed description taken in conjunction with the accompanying drawings, in which:

FIG. 2B is a detailed view of the motor assembly of FIG. 2A, showing the motor assembly having one or more flame paths;

DETAILED DESCRIPTION

Figure 1A:
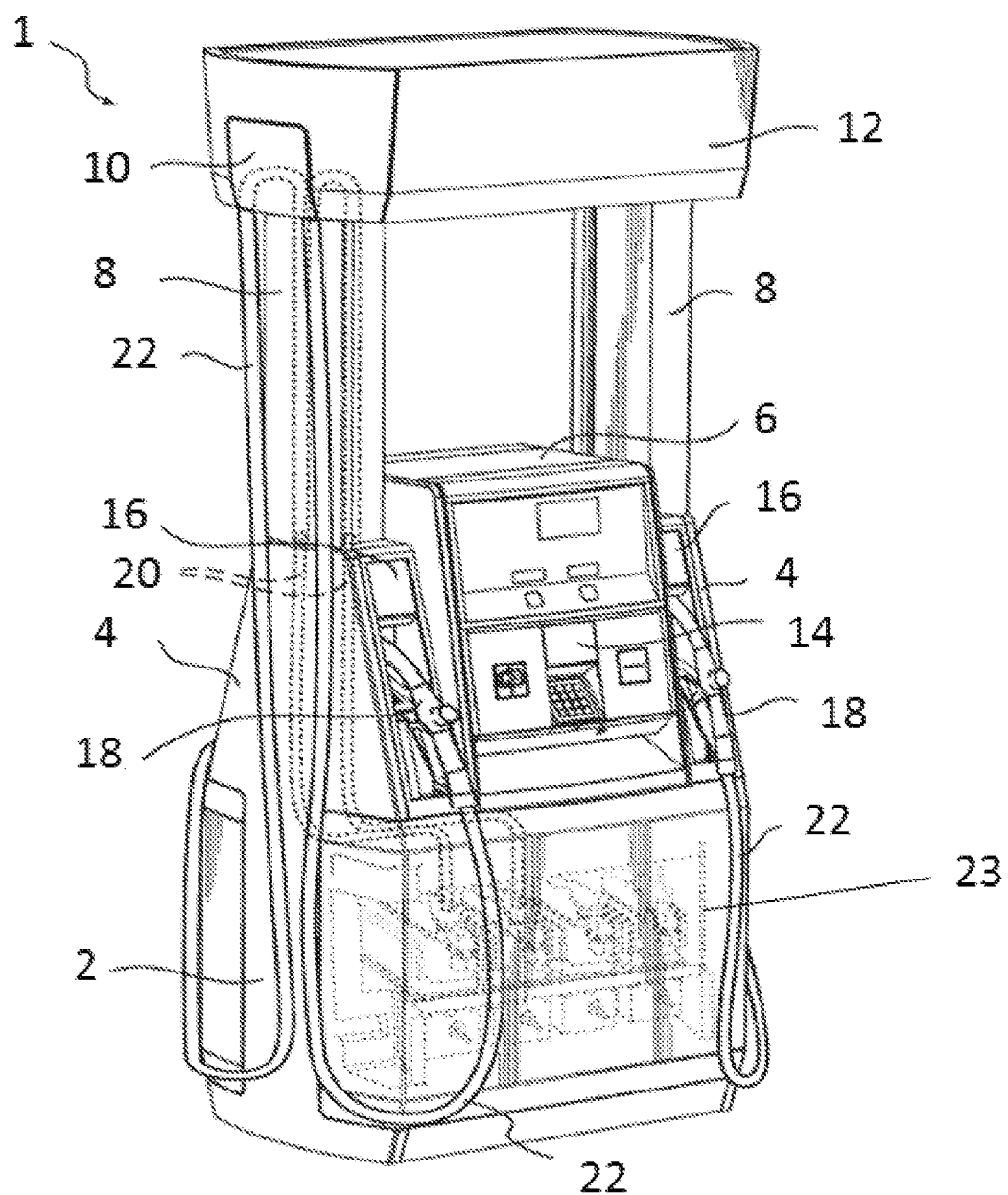
FIG. 1A is a perspective, partially transparent view of one embodiment of a fuel dispenser unit.

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

Reference throughout the specification to "various embodiments," "some embodiments," "one embodiment," or "an embodiment", or the like, means that a particular feature, structure, or characteristic described in connection with the embodiment is included in at least one embodiment. Thus, appearances of the phrases "in various embodiments," "in some embodiments," "in one embodiment," or "in an embodiment", or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

In general, a protective end cap assembly for use with a motor in a fuel dispenser system is provided. The end cap assembly can be provided as a separate assembly for use in connection with any pre-existing motor assembly, or it can be provided as part of a motor assembly. In general, the protective end cap assembly includes a junction box housing that defines a compartment for housing a junction box. The junction box housing can include a first end that is configured to mate to an open end of a motor housing, a barrier wall extending thereacross for sealing a motor within the motor housing, and a second end that is configured to mate to an endplate such that a junction box compartment is formed between the end plate and the barrier wall. The barrier wall can include at least one opening formed therethrough for receiving at least one electrical connector on a motor, and the end plate can include at least one opening formed therethrough for receiving at least one external electrical connector therethrough to allow the motor electrical connectors and the external electrical connectors to be electrically coupled via a junction box disposed within the junction box compartment. Accordingly, during motor assembly replacement, the end plate can be detached from the junction box housing to expose the junction box, where electrical connections can be added or removed. Thus, the integrated junction box housing allows the motor assembly with the junction box housing coupled thereto to be replaced in the field, while the electrical connectors extending from the junction box through the end plate remain intact.

While the protective end cap assembly can be used with a motor in any fuel dispenser, by way of non-limiting example FIG. 1A illustrates one embodiment of a fuel dispenser system 1. The configuration of the fuel dispenser system 1 can vary depending on the exact components included, but in the illustrated embodiment the fuel dispenser system 1 generally includes a base module 2, one or more nozzle modules 4, an electronics module 6, one or more columns 8, a top module 1.0, and one or more display sections 12. As shown in FIG. 1A, the base module 2 can be placed on the ground at a suitable location for the fuel dispenser system 1. The electronics module 6 is positioned on top of the base module 2, whereby a user interface unit 14 can be located at a suitable height for a user operating the fuel dispenser system 1. The user interface unit 14 can be configured to allow a user/customer to conduct a transaction at the fuel dispenser system 1, and thus can include a variety of input and output devices, such as a keypad or touchscreen, a display for displaying various information (e.g., price, fuel volume, etc.), octane selection buttons, etc. As further illustrated in FIG. 1A, a through opening can also be provided as part of the electronics module 6 separating the user interface 14 from the base module 2. An access door 23 can be configured to be opened and closed to provide access to an interior of the base module 2.

One or more nozzle modules 4 can be positioned on top of the base module 2. As shown in FIG. 1A, two nozzle modules are provided, with one on each side of the electronics module 6. Each nozzle module 4 can include at least one nozzle boot 16 configured to receive a nozzle 18. A column 8 can be placed on top of a nozzle module 4, and two columns 8 can in turn provide support to the top module 10. The display section 12 with display surfaces for advertisement and/or informational materials can be optionally placed on top of the top module 10 and can partially enclose the top module 10. In some embodiments, the fuel dispenser system 1 can include a tube arrangement 20 and one or more hoses 22 connected thereto for transporting fuel from an underground fuel reservoir (not shown) to the nozzles 18. The tube arrangement 11 can extend from the underground fuel reservoir to the nozzle module 4. The tube arrangement 11 can also couple to a hose 22, where each hose 22 is further coupled to a nozzle 18 on each side of the fuel dispenser system 1. Each nozzle 18 can be secured by a nozzle boot 16 when not in use. The nozzle boot 16 may further include a mechanical or electronic switch (not shown) to indicate when the nozzle 18 has been removed for a fuel dispensing request and when the nozzle 18 has been replaced, signifying the end of a fueling transaction.

During a refueling operation, fuel flow can travel through and be controlled by components located in the base module 2 of the fuel dispenser system 1. For example, fuel from the underground fuel reservoir can be pumped through a piping network into inlet or fuel dispensing pipes using one or more fuel pumps. When fuel is dispensed, it travels through a meter (not shown) located in the base module 2, which is responsive to flow rate or volume. A pulser (not shown) can be employed to generate a signal in response to fuel movement through the meter. A data line provides a signaling path from the pulser to a control system, indicating the flow rate or volume of fuel being dispensed within the meter. As the refueling operation progresses, fuel is delivered through the hose 22 and the nozzle 18 into a customer's vehicle (not shown).

Figure 1B:
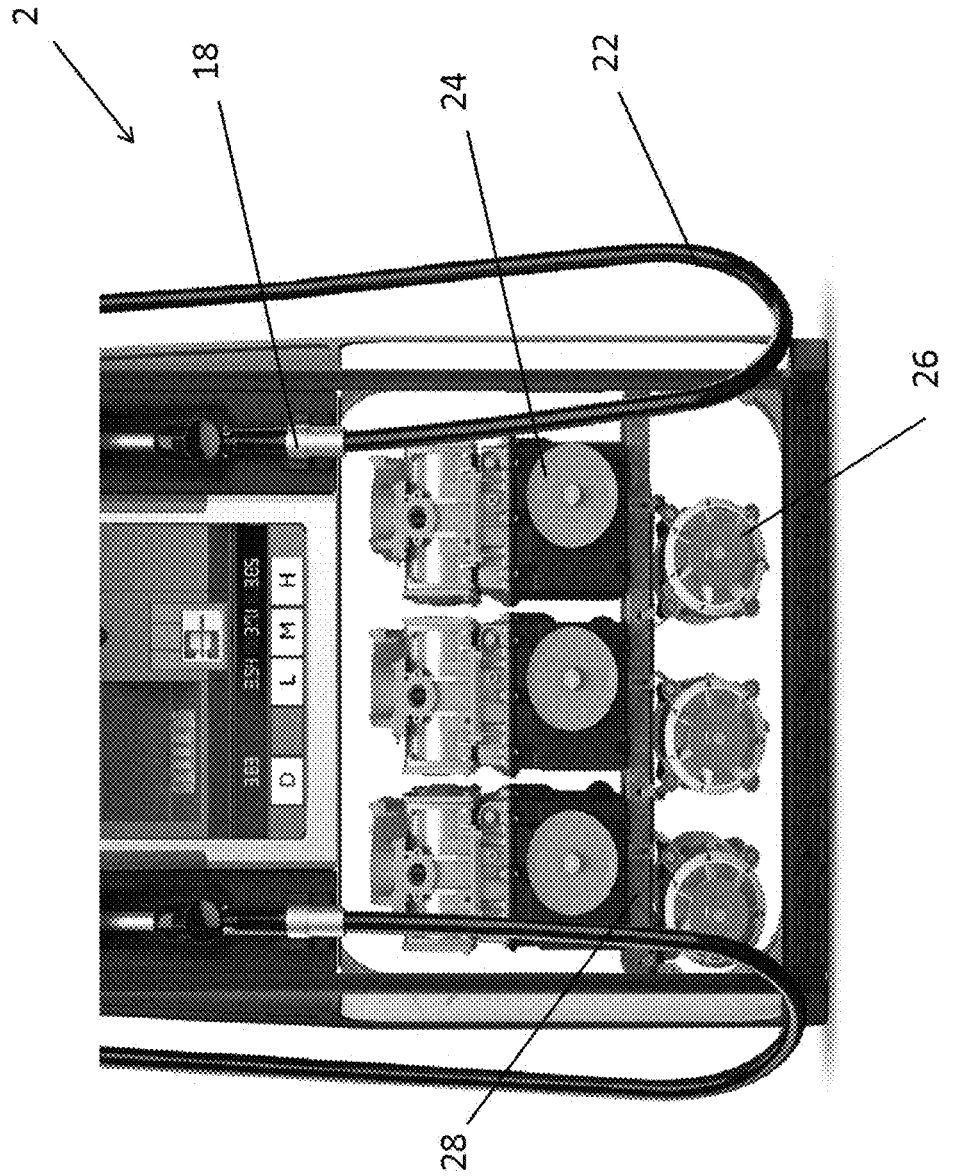
FIG. 1B is an internal perspective view of a portion of the fuel dispenser unit of FIG. 1A, showing multiple motor assemblies attached to the fuel dispenser unit.

FIG. 1B illustrates some of the internal components of the base module 2 in more detail, and in particular the components that are effective to transfer fuel from the underground reservoir to a vehicle's fuel tank. In general, fuel pumps and electrical motors utilized by a fuel dispenser unit can be assembled in either a centrifugal pump-motor configuration, where the pumps and motors are submerged beneath the fuel in the underground fuel reservoir; or the pumps and motors can be assembled in a positive displacement configuration and can be mounted above ground and inside a cabinet, as shown in this illustrated embodiment. As shown in FIG. 1B, the base module 2 includes one or more fuel pumps 24 powered by one or more electrical motors 26. The fuel pumps 24 can be seated on top of a shelf 28 and can be configured to draw fuel from the underground reservoir. The fuel is subsequently supplied to a vehicle's fuel tank through the hoses 22 and nozzles 18. For example, activation of a switch on the fuel dispenser system 1 activates the electrically powered fuel pump 24, causing the fuel to move toward the fuel dispenser. Opening a valve in the nozzle 18 at the end of the dispensing hose 22 attached to the fuel dispenser system 1 allows fuel to be delivered from the underground reservoir into the vehicle's fuel tank. In use, each pump 24 is powered by an electrical motor 26 mounted underneath the shelf 28. Each electrical motor 26 can include a bracket structure (discussed in more detail below) fixed to the motor's outer housing (also referred to as a "casing") of the motor and configured to secure the motor onto a bottom side of the shelf 28 as in the illustrated embodiment. Electrical power to each motor 26 is supplied through one or more power cables (not shown) coupled to the motors 26 through a cable feed-through, where the feed-through is rigorously sealed to prevent fuel vapors from entering the motor housing.

A person skilled in the art will appreciate that fuel dispensers are generally located in an environment where open flames, static electrical discharge, or sparks can be extremely dangerous due to the omnipresent fuel vapor. As such, flame proof electrical motors are preferably utilized to power the fuel pumps. A flame proof motor, such as a motor constructed according to the UL (Underwriters Laboratories) standard, can have an extra robust motor housing designed to withstand a potential explosion that occurs within the motor, as well as one or more flame paths for venting and cooling hot gas from inside the motor, in order to prevent the hot gas from igniting the outside fuel vapor surrounding the motor. In addition, the entire base module 2 including the motors 26 and pump 24 can be shielded from the electronics module 6 by either creating an open space, such as a through opening as described above in connection with FIG. 1A, or using a shielding layer, such as an explosion proof housing (not shown).

Figure 2A:
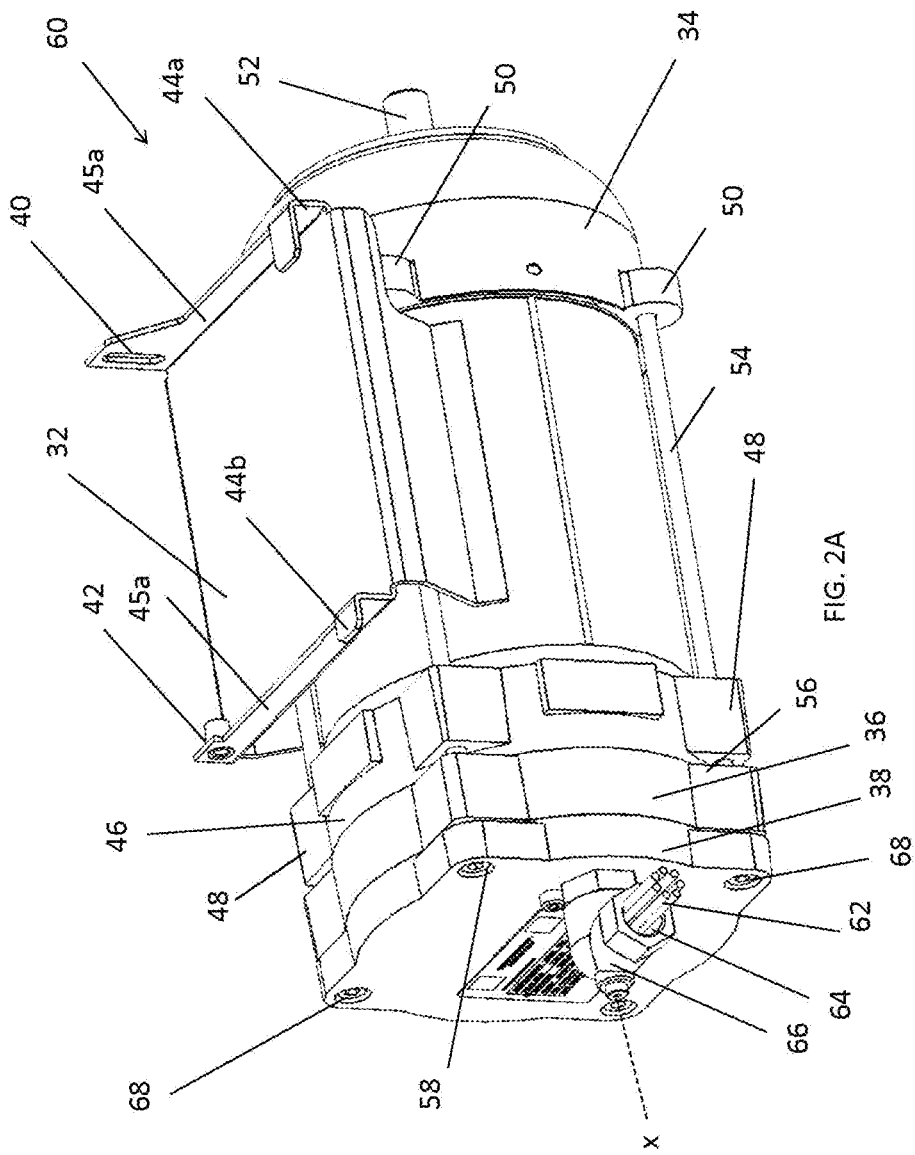
FIG. 2A is a perspective view of one embodiment of a motor assembly for use with the fuel dispenser of FIGS. 1A and 1B.

FIG. 2A illustrates one embodiment of an electrical motor assembly 60. In the illustrated embodiment, the electrical motor assembly 60 includes a bracket 32, an outer housing 34, a junction box housing 36, and an end plate 38. The bracket 32 in the illustrated embodiment is attached to the motor's outer housing 34 and is configured to be mounted onto one or more hangers or another bracket located in the base module 2, as shown in FIG. 1B. In some embodiments, the bracket 32 can be welded onto the outer housing 34, or fixed onto the outer housing 34 by one or more screws. Two hanging surfaces 44a, 44b protruding out of the two wings 45a, 45b of the bracket 32 can be provided for mounting the bracket 32 onto a receiving bracket (not shown) located in the base module 2. The bracket 32 can further include a first bore 42 and a cam slot 40 where one or more screws or rods can be affixed between the first bore 42 and the cam slot 40 and secure the bracket 32 onto the receiving bracket or hanger. A person skilled in the art will appreciate that the bracket can have a variety of configurations, and that various techniques known in the art can be used to mount the motor within the base module.

As further shown in FIG. 2A, the outer housing 34 is in the form of a generally hollow circular housing and includes an open end section 46 configured to receive and attach additional compartment plates to the outer housing 34. The open end section 46 is located distally away from the motor's shaft 52 and has four receivers 48 located on four corners of the open end section 46. The receivers 48 can be configured to receive one or more rods 54 designed to secure the additional compartment plates, as discussed in more detail below. On the opposite, proximal end of the outer housing 34, the motor assembly 60 includes four end receivers 50 positioned adjacent to the shaft 52. The end receivers 50 are affixed to the four corners of the motor's outer housing 34 and are configured to receive the one or more rods 54. A person skilled in the art will appreciate that a variety of techniques can be used to attach one or more compartment plates to the outer housing 34.

The junction box housing 36 can be configured to mate to the open end section 46 of the outer housing 34. While the junction box housing 36 can have various configurations for separating the motor components from a junction box, in an exemplary embodiment it has a size and shape that is generally configured to match the size and shape of the open end of the motor housing 34. In the illustrated embodiment, the junction box housing 36 is generally circular, but includes various features formed thereon to facilitate attachment of the junction box housing 36 to the motor's open end section 46, as will be discussed below. As shown in more detail in FIG. 2B, the junction box housing 36 includes a generally cylindrical outer sidewall and a barrier plate 84 extending thereacross that effectively shields the motor assembly's 60 internal components from external environmental elements. The barrier plate 84 can be generally circular in nature and has an opening 78 designed to provide a passage for electrical connectors to the motor's internal components.

In order to mate the junction box housing 36 to the motor housing 34, the junction box housing 36 in one embodiment can include four rod receiving slots 56 affixed to four corners of the junction box housing 36. When the junction box housing 36 is stacked against the open end section 46 as shown in FIG. 2A, a rod 54 can be inserted through the rod receiving slot 56, the receiver 48, and the end receiver 50 to secure the junction box housing 36 to the motor's outer housing 34. As discussed in more detail below, the rod 54 can include a receiver at one end configured to receive a coupling member, such as a screw. Thus, additional compartment plates can be attached to the junction box housing 36 by inserting a screw into the receiver. For example, in the illustrated embodiment, the end plate 38 is attached to the junction box housing 36 using four screws 68. The end plate 38 includes four through holes 58 located at four corners of the end plate 38 configured to receive screws.

Figure 2C:
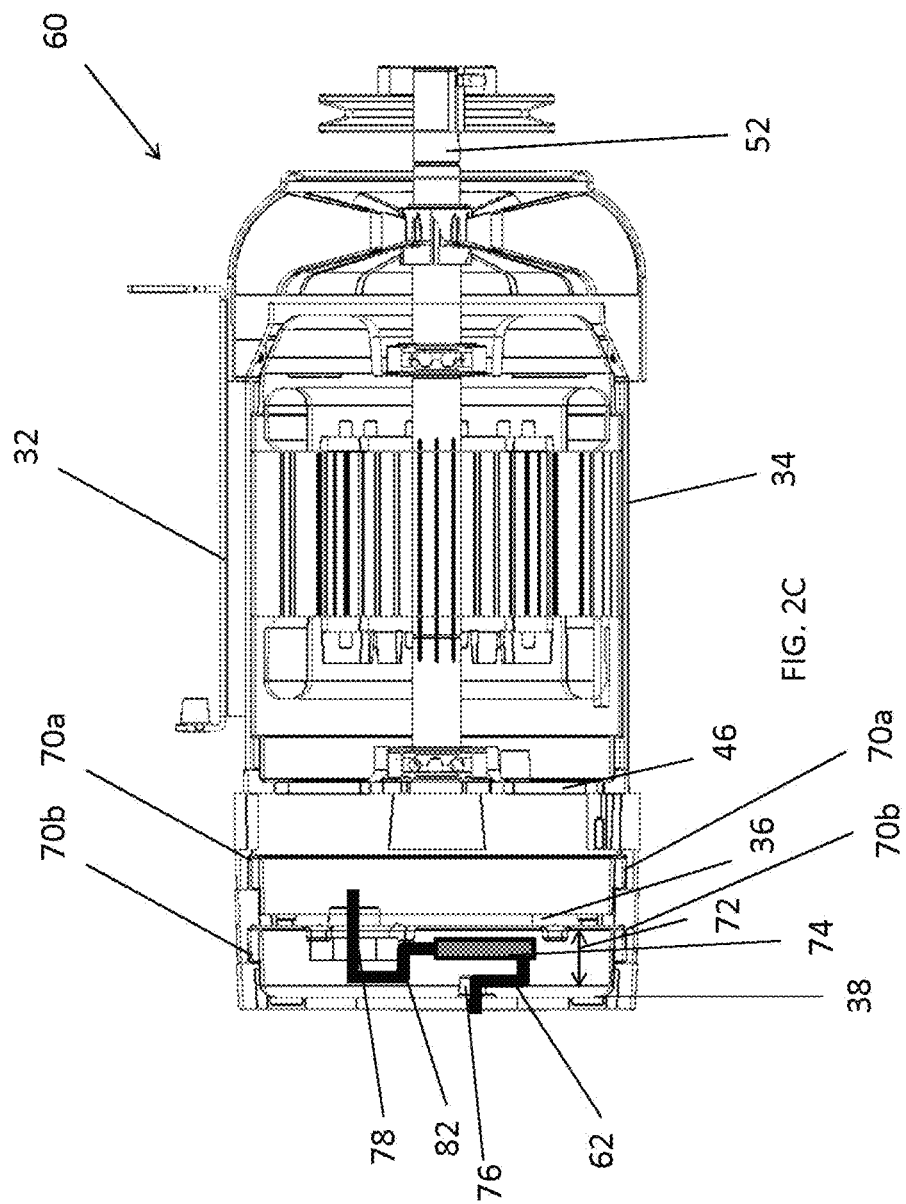
FIG. 2C is a cross-sectional view of the motor assembly of FIG. 2A, showing various internal components of the motor assembly.
Figure 2D:
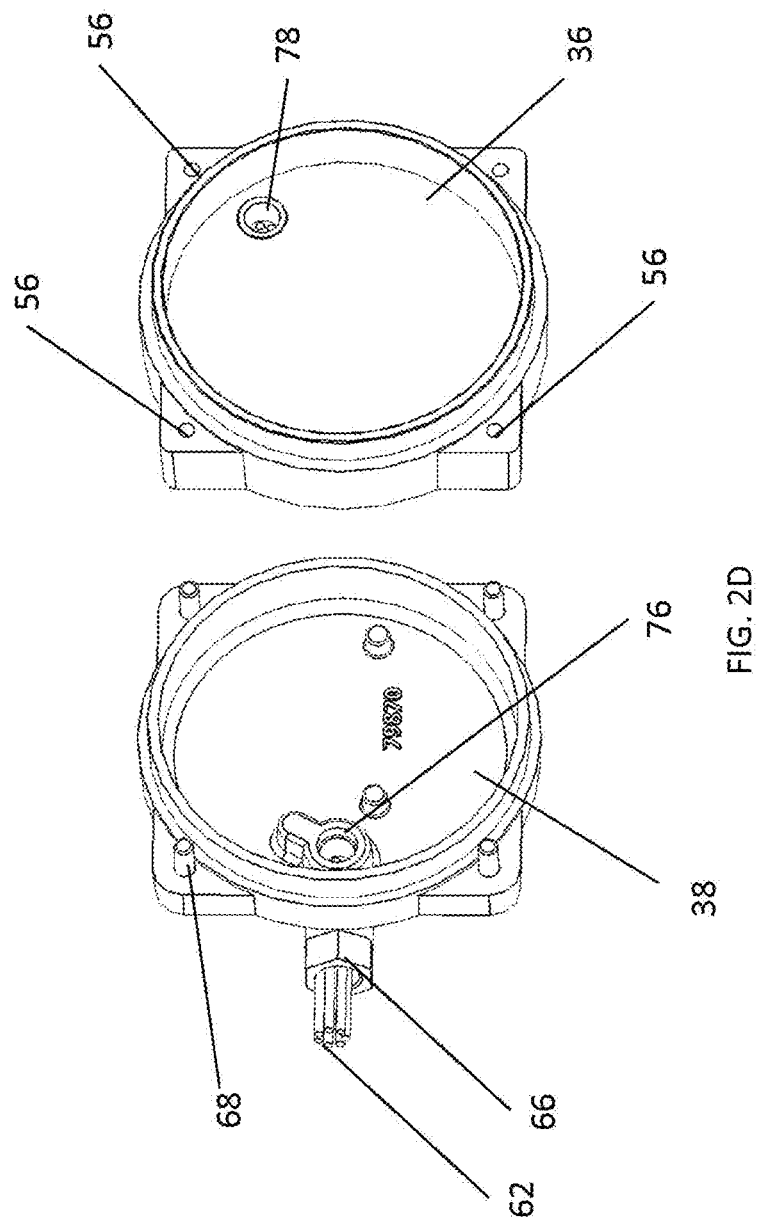
FIG. 2D is side perspective view of the end plate and junction box housing of the motor assembly of FIG. 2A.
Figure 2E:
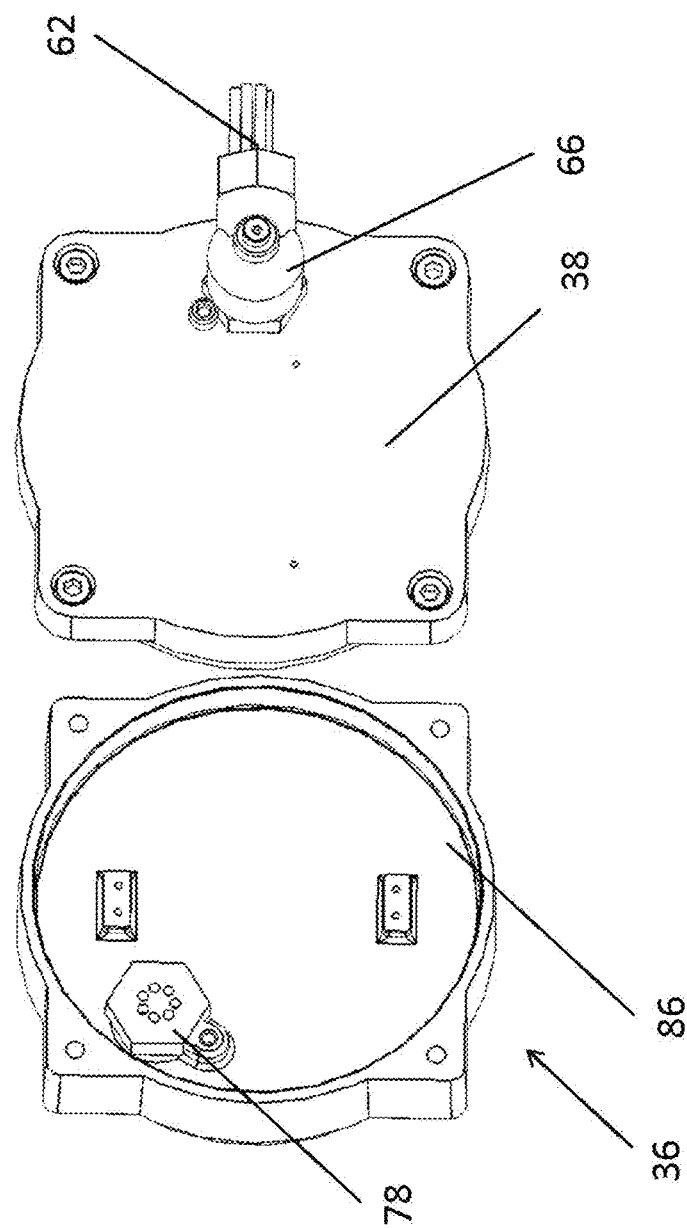
FIG. 2E is another side perspective view of the end plate and junction box housing the motor assembly of FIG. 2A.

The end plate 38 can be similar to the junction box housing and can includes a generally cylindrical sidewall with a circular plate 86 extending thereacross, as shown in more detail in FIG. 2E. The end plate 38 can have a size and shape that is generally configured to match the size and shape of the junction box housing 36. When the end plate 38 is fitted onto the junction box housing 36, the circular plate 86 and the barrier plate 84 effectively form a compartment space therebetween that is capable of housing one or more junction boxes, where the junction boxes are separated from the motor's 60 internal components by the barrier plate 84, as illustrated in more detail in FIG. 2C.

While the size of the compartment space can vary, in one exemplary embodiment the created compartment space can have a width W that is about 30 mm. A person skilled in the art will appreciate that the exact dimensions of the compartment can vary depending on the size of the junction box used. The junction box is a container for electrical connections, and is configured to conceal one or more electrical connectors, such as wires or cables, from hazardous environmental elements such as fuel vapors. The junction box can prevent sparks produced by the electrical connectors from igniting the fuel vapor. In an exemplary embodiment, the junction box can include a terminal strip (not shown) and/or a control relay for coupling one or more external electrical connectors to the electrical motor. For example, in the illustrated embodiment, seven electrical wires 62 consisting of five power cables and two 24V signal cables are fed through a conduit 64 enclosed in a swivel 66 attached to the end plate 38. The swivel 66 can be constructed of metallic material and the conduit 64 can be sealed off from external elements, such as fuel vapors, by using materials such as epoxy. As discussed in more detail below, the swivel 66 can be connected to an opening on the end plate 38 where the electrical wires 62 can be fed through the end plate 38 and connected to the terminal strip. It should be noted that the end plate 38 together with the swivel 66 and associated cables and conduits can be sealed with epoxy and/or cement and subsequently cured at a separate time from the production of the dispenser unit 1, which can greatly reduce dispenser unit 1 production time and complexity. Furthermore, the junction box housing 36 can similarly have an opening (not shown) where electrical connectors from the junction box can be fed through the opening and into the motor. In the illustrated configuration, the opening on the junction box housing 36 is also sealed with epoxy like material and the junction box housing 36 effectively functions as a barrier layer shielding the junction box from the internal components of the electrical motor.

In some embodiments, the swivel 66 can be configured to rotate alone an axis x as illustrated in FIG. 2A. For example, the motor assembly 60 may be used to drive a fuel pump (as illustrated in FIG. 1B) using a belt (not shown), and the motor assembly 60 may be positioned to pivot and/or tilt toward one corner to exert tension on the belt. As such, the conduit 64 and the enclosed cables 62 will also tilt one way or another accordingly. To minimize the tension exerted onto the conduit 64 and the cables 62 from the tilting of the motor assembly, the swivel 66 can rotate alone the axis x to reduce twisting and tangling of the cables 62, which in turn can protect the epoxy seal inside the conduit 64.

In use, the end plate 38 can be detached from the junction box housing 36 by removing the four screws 68 from the end plate 38, where the junction box housing 36 is attached to the motor's open end section 46. Once the end plate 38 is removed from the motor, the junction box containing one or more electrical connectors is exposed and a user can proceed to decouple the electrical connectors. This can be done by, for example, removing the one or more electrical connectors from the terminal strip located within the junction box. Subsequently the motor assembly 60 and the junction box housing 36 can be then removed from the base module 2 as a discrete unit by decoupling the bracket 32 from the receiving bracket or hanger. In turn, a new electrical motor can be conveniently placed into the fuel dispenser system 1 by coupling the new motor's electrical connectors to the junction box and attaching the new motor's junction box housing to the end plate 38. According to this exemplary method, an electrical motor assembly can be replaced within a fuel dispenser unit in the field without requiring a user to break or replace the epoxy seals in the motor, which can be a tedious endeavor and may be a violation to the above mentioned safety standards. In addition, compared to conventional methods, the method illustrated here allows the motor assembly 60 to be conveniently replaced in the field as a completely and properly sealed unit where structural robustness is maintained. Furthermore, at least one additional flame path (to be discussed in more details below) is formed in this illustrated configuration, further improving the durability of the motor assembly.

In some embodiments, the junction box housing plate 36 can be detached from the motor's outer housing 34 to conveniently remove or replace one or more components of the motor assembly 60. For example, the control relay of the motor assembly 60 may be functioning abnormally and needs to be replaced. Conventionally the entire motor assembly 60 may have to be replaced because the end plate 38 cannot be properly removed in the field. However, according to the illustrated embodiment, once the end plate 38 is removed as discussed above, the junction box positioned between the end plate 38 and the junction box housing plate 36 (shown in more detail below in FIG. 2C) becomes easily accessible where one or more components enclosed within the junction box (e.g., the control relay) can be repair and/or replaced. In use, the end plate 38 can be subsequently reattached to the junction box housing plate 36 when a desired operation on the motor assembly 60 (e.g., replacing the control relay) is completed, and the motor assembly 60 can be placed back into operation with minimum down time.

FIG. 2B illustrates a cross-sectional view of the motor assembly 60, and in particular the part of the motor containing one or more flame paths 70a, 70b. While the motor assembly 60 can be sealed from the surrounding fuel vapor, a person skilled in the art will appreciate that under certain conditions the vapor may still penetrate the motor assembly 60. Therefore, in a flameproof motor, explosion may still occur within the motor's outer housing 34. However, the outer housing 34 is designed with sufficient strength to withstand the occurrence of any internal explosion of the flammable fuel vapor. Any flame passing from inside of the outer housing 34 to the outside of the outer housing 34 needs to be cooled to such an extent that is it incapable of igniting the surrounding fuel vapor. Accordingly, flame paths 70a, 70b are incorporated into the motor's enclosure and are designed to be sufficiently long and narrow to vent and cool off the hot gas produced from any internal explosion.

As shown in FIG. 2B, in addition to the flame path 70b created in the fitting between the end plate 38 and the junction box housing 36, an additional flame path 70a can be formed in the fitting between the junction box housing 36 and the motor's outer housing 34. Each flame path 70a, 70b can be created by providing a space or gap between the joint where the two components are press-fit together. Flame path 70a can be created when the fuel dispenser system 1 is originally manufactured, where by design the structural robustness of the motor's enclosure (the outer housing 34 and the junction box housing 36) has sufficient strength to withstand the occurrence of any internal explosion. For example, as illustrated in FIG. 2B, the junction box housing 36 includes a first flange 71a formed on an edge of the barrier plate 84 and configured to overlap with a flange 71b protruding out of the end plate's 38 edge. The flanges 71a, 71b are designed to be mismatched slightly to create a narrow gap (i.e., flame path 70b) in the motor assembly's 60 enclosure to allow the hot gas (produced by internal explosions) to escape. The narrow gap can be contoured as shown in FIG. 2B to create sufficient length to allow the hot gas to cool down before entering the surrounding environment. Similarly, a second flange 71c formed on the edge of the junction box housing's 36 barrier plate 84 can be configured to overlap with another flange 71d protruding out of motor assembly's 60 open end section 46, where the flange 71c, 71d are designed to form another narrow gap that effectively functions as another flame path 70a. During a motor assembly 60 replacement process, as discussed above, because the junction box housing 36 and the motor's outer housing 34 are replaced as a single unit and are never taken apart during the motor replacement process, this structural robustness is therefore never compromised. As such, in the illustrated configuration, the electrical motor assembly 60 can be conveniently replaced in the field without breaking or replacing any epoxy seals while maintaining a structural robustness required by the safety standards as original designed. Furthermore, by fitting the end plate 38 to the junction box housing 36, an additional compartment space 72 is effectively formed between the junction box housing's 36 barrier plate 84 and the end plate 38, where the additional compartment space 72 has a width w that is designed to accommodate one or more junction boxes (not shown). The junction box is shielded from components of the motor assembly 60 by the barrier plate 84 as illustrated in FIG. 2B. Electrical connections from the motor's internal components can be fed through and coupled to the junction box through an opening 78 created on the barrier plate 84, where the opening 78 is also preferably sealed with epoxy like material.

FIG. 2C illustrates the end plate 38, the junction box housing 36, and junction box 74 in the assembled configuration. When assembled, the junction box housing 36 and the end plate 38 effectively create a compartment space 72 where the junction box 74 can be placed. The junction box 74 provides connections for wires external to the motor assembly 60 to the wires internal to the motor assembly 60. As shown in FIG. 2C, the end plate 38 includes an opening 76 where external wires 62 such as power and/or signal cables can be enclosed within a conduit (not shown) and fed through the end plate 38. The opening is preferably sealed from external elements using epoxy like materials to prevent fuel vapor from entering the compartment space 72. The external cables 62 can be connected to a terminal strip (not shown) concealed within the junction box 74, which in turn connects the external cables to internal cables 82 fed through an opening 78 located on the junction box housing 36. The internal cables 82 can also be enclosed in a conduit (not shown) and can be configured to provide power and/or signal to the motor assembly's 60 internal components. The conduit and the second opening 78 can also be sealed using epoxy like material to prevent fuel vapor from entering the motor assembly's 60 outer housing 34. In cases where the fuel vapor does penetrate the motor assembly's 60 enclosure and causes an internal explosion within the motor assembly 60, the flame paths 70a, 70b are configured to vent and cool the hot gas produced by the explosion without igniting the fuel vapor external to the motor assembly 60. As discussed above, flame path 70a remains intact when the motor assembly and junction box housing 36 are removed as a unit, while flame path 70b is separated due to the end plate 38 being detached from the junction box housing 36.

FIGS. 2D and 2E are side perspective views of the end plate 38 and junction box housing 36. As shown, the end plate 38 has four bores located on four edges of the end plate 38 that are configured to receive coupling screws 68. The coupling screws 68 may have threads (not shown) and can be configured to be threaded into one end of the one or more rods 54 (as shown in FIG. 2A), where the rods 54 are used to secure the junction box housing 36 to the outer housing 34 of the motor assembly 60. The end plate 38 also includes an opening 76 where multiple wires 62 enclosed by a conduit can be passed through the end plate 38 and through a swivel 66 coupled to the opening 76 in the end plate 38. The multiple wires 62 can be connected to electrical connections inside the junction box 74, as illustrated in FIG. 2C, and the conduit can be sealed by an epoxy like material to prevent any fuel vapor from penetrating through the end plate 38. When the motor assembly 60 is being replaced, the motor assembly 60 can be detached from the end plate 38 by removing the four coupling screws 68 from the bores. The end plate 38, and the electrical connections extending therethrough, can remain intact without the need to break the seal formed by the epoxy. With the end plate 38 detached, the junction box 74 is exposed and electrical connections inside the box 74 can be removed or added as desired. The motor can thus be removed and replaced.

As further shown in FIGS. 2D and 2E, the junction box housing 36 can have four rod receiving slots 56 affixed to four corners of the junction box housing 36 and configured to receive the coupling screws 68. The junction box housing 36 can include a second opening 78 where multiple wires can be fed from the motor assembly through the junction box housing 36. The multiple wires can be connected to the external wires 62 at the junction box. When the motor assembly 60 is being replaced, a user can simply remove the electrical connectors from the first motor at the junction box 74 and then attach the electrical connectors from a second motor (not shown), hence eliminating the need to add or remove any epoxy seals in the process.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:
1. A motor assembly, comprising:
   a motor housing having a motor disposed therein and an open end;
   an end plate having an opening formed therethrough for receiving at least one electrical connector therethrough, the opening being off-center from a central longitudinal axis of the motor housing;
   a junction box housing coupled between the open end of the motor housing and the end plate, the junction box housing having a barrier wall extending thereacross such that a junction box compartment is formed between the barrier wall and the end plate, the barrier wall including an opening formed therethrough for receiving an electrical connector from the motor, and a junction box disposed within the compartment and configured to couple at least one electrical connector extending through the opening in the end plate with at least one electrical connector extending from the motor and through the opening in the barrier wall.

2. The motor assembly of claim 1, wherein the end plate is removably mated to the junction box housing.

3. The motor assembly of claim 1, wherein the motor includes a plurality of electrical connectors that extend through the opening in the barrier wall to connect to the junction box.

4. The motor assembly of claim 1, wherein the opening in the end plate includes a connector that comprises a swivel.

5. The motor assembly of claim 1, wherein the junction box housing maintains the end plate at a distance apart from the open end of the motor housing.

6. The motor assembly of claim 1, wherein a distance between the barrier wall and the end plate is about 30 mm.

7. A protective end cap assembly for use with a motor in a fuel dispenser system, comprising:

a junction box housing having a barrier wall extending thereacross between first and second ends, the first end being configured to mate to an open end of a motor housing such that the barrier wall seals a motor within the motor housing, and the barrier wall having at least one opening formed therethrough for receiving at least one electrical connector on a motor; and an end plate that is releasably matable to the second end of the junction box housing such that the end plate and the barrier wall define a junction box compartment therebetween, the end plate having a connector coupled thereto and off-center from a central longitudinal axis of the protective end cap assembly, the end plate defining a pathway therethrough for receiving at least one electrical connector such that the at least one electrical connector can extend through the end plate and into the junction box compartment in for mating to a junction box.

8. The assembly of claim 7, further comprising a junction box disposed within the junction box compartment and configured to connect at least one electrical connector from a motor to at least one electrical connector extending through the end plate.

9. The assembly of claim 7, wherein the connector on the end plate comprises a swivel.

10. The assembly of claim 7, wherein the junction box housing maintains the end plate at a distance apart from the barrier wall of the junction box housing.

11. The assembly of claim 10, wherein the distance is about 30 mm.

12. The assembly of claim 10, further comprising a conduit extending through the connector, the conduit having a pathway formed there through for receiving at least one electrical connector.

13. A method for replacing a motor in a fuel dispenser, comprising:

detaching an end plate from a junction box housing coupled to a motor to expose a junction box contained within the junction box housing, the junction box being isolated from the motor by a barrier wall disposed between the motor and the junction box, the end plate having a first opening therethrough, at least a first electrical connector extending from the junction box and through the first opening such that the first opening forms a seal around the first electrical connector;

decoupling at least a second electrical connector from the junction box to allow the motor and junction box housing to be removed without breaking the seal between the first opening and the first electrical connection, the second electrical connector extending from the motor and through the barrier wall to the junction box.

14. The method of claim 13, further comprising:

attaching at least one electrical connector extending from a second motor, through a barrier wall of a second junction box housing, to the junction box; and attaching the second junction box housing to the end plate to retain the junction box within the second junction box housing.

15. The method of claim 13, wherein the end plate, junction box housing, and motor are disposed within a fuel dispenser housing, and the method further includes, prior to detaching the end plate, opening an access door of the fuel dispenser housing to access the motor.

16. The method of claim 13, wherein the first and second electrical connectors provide power to the motor when the motor is electrically coupled to the junction box.

* * * * *